United States Patent [19]

Jonas et al.

[11] Patent Number: 4,831,813
[45] Date of Patent: May 23, 1989

[54] SYSTEM FOR AUTOMATIC PERFORMANCE OF AGRICULTURAL TASKS SUCH AS LAWN MOWING

[76] Inventors: André Jonas, 31 chemin du Colombier; Bernard Jonas, 29 chemin du Colombier, both of 06650 Le Rouret, France

[21] Appl. No.: 101,027

[22] Filed: Sep. 25, 1987

[30] Foreign Application Priority Data

Jan. 22, 1987 [FR] France .................. 87 00723
Sep. 26, 1987 [FR] France .................. 86 13469

[51] Int. Cl.$^4$ ............... A01D 34/00; A01D 69/02
[52] U.S. Cl. ................... 56/10.2; 56/DIG. 15; 180/131
[58] Field of Search ........ 180/131; 56/10.2, DIG. 15; 446/446; 104/140

[56] References Cited

U.S. PATENT DOCUMENTS

| | | | |
|---|---|---|---|
| 2,339,291 | 1/1944 | Paulus et al. | 180/131 |
| 2,509,914 | 5/1950 | Goodwine, Jr. | 56/10.2 |
| 2,925,875 | 2/1960 | Bourdon | 180/131 |
| 3,073,409 | 1/1963 | Daifotes | 180/131 |
| 3,381,456 | 5/1968 | Taylor | 56/10.2 |
| 3,402,784 | 9/1968 | Roberson et al. | 180/131 |
| 3,410,223 | 11/1968 | Miller | 104/140 |
| 3,425,197 | 2/1969 | Kita | 56/10.2 |
| 3,550,714 | 12/1970 | Bellinger | 56/10.2 |
| 3,570,227 | 3/1971 | Bellinger | 56/10.2 |
| 3,583,514 | 6/1971 | Taylor | 56/10.2 |
| 3,650,097 | 3/1972 | Nokes | 56/10.2 |
| 3,765,501 | 10/1973 | Buruee | 180/131 |
| 3,772,994 | 11/1973 | Juarbe | 104/140 |
| 3,792,208 | 3/1974 | Strubbe | 56/10.2 |
| 3,835,779 | 5/1975 | Block | 56/10.2 |
| 3,924,389 | 12/1975 | Kita | 56/10.2 |
| 3,946,825 | 3/1976 | Gail | 56/10.2 |
| 3,952,828 | 4/1976 | Stampfer et al. | 56/10.2 |
| 3,972,381 | 8/1976 | Gail | 56/10.2 |
| 4,104,851 | 8/1978 | Perry | 56/10.4 |
| 4,180,964 | 1/1980 | Pansure | 56/DIG. 15 |
| 4,184,559 | 1/1980 | Rass | 56/DIG. 15 |
| 4,206,580 | 6/1980 | Truax et al. | 56/10.4 |
| 4,298,084 | 11/1981 | Newell | 180/131 |
| 4,347,791 | 9/1982 | Mandros | 104/140 |
| 4,347,908 | 9/1982 | Anderson | 56/DIG. 15 |
| 4,363,274 | 12/1982 | Lund | 180/131 |
| 4,399,904 | 8/1983 | Canriani | 104/140 |
| 4,545,453 | 10/1985 | Yoshimura et al. | 56/DIG. 15 |

FOREIGN PATENT DOCUMENTS

| | | |
|---|---|---|
| 2346927 | 4/1975 | Fed. Rep. of Germany . |
| 2807482 | 8/1979 | Fed. Rep. of Germany . |
| 3332192 | 3/1985 | Fed. Rep. of Germany . |
| 2404555 | 4/1979 | France . |

*Primary Examiner*—Paul J. Hirsch
*Attorney, Agent, or Firm*—Hoffman, Wasson, Fallow & Gitler

[57] ABSTRACT

This invention relates to a system for automatic performance of agricultural tasks such as lawn mowing. It comprises in combination a guide rail (2; 110) more or less buried in the ground, and an agricultural vehicle such as a lawn mower, provided with a support frame (6; 101), with at least one tool such as a cutting bar (8, 16a, 16b; 102), drive means (4a, 4b, 5a, 5b; 103, 104a, 104b) and guide means (27, 29; 106, 108) mounted movably on said support frame and designed to work with said guide rail to cause said vehicle approximately to follow the guide rail.

7 Claims, 4 Drawing Sheets

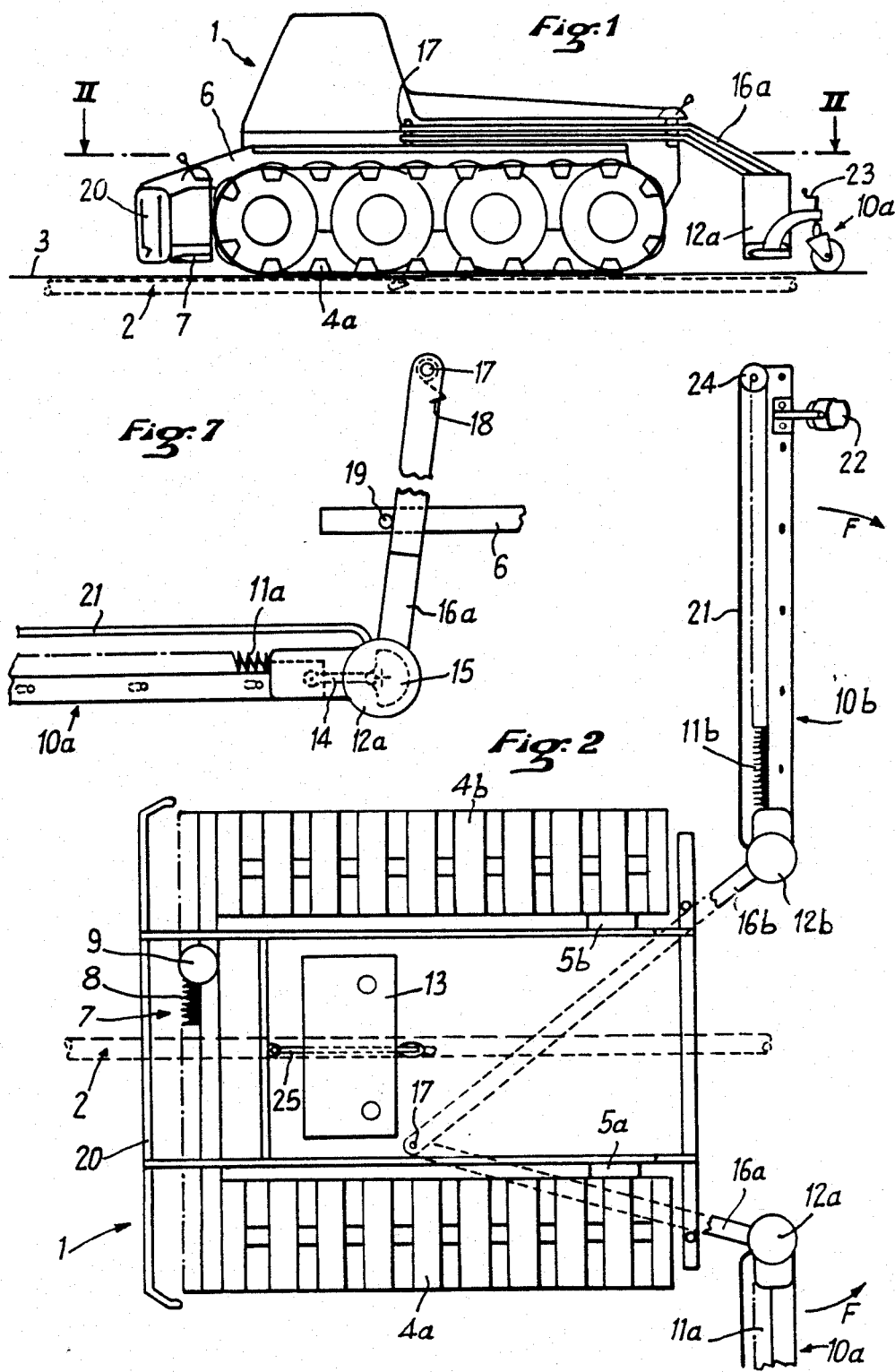

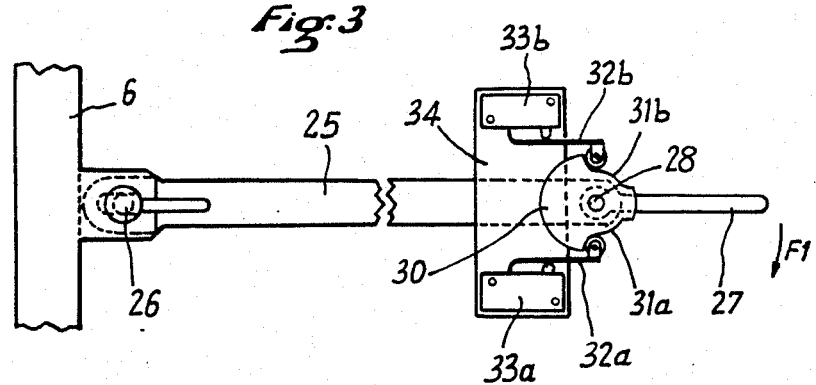
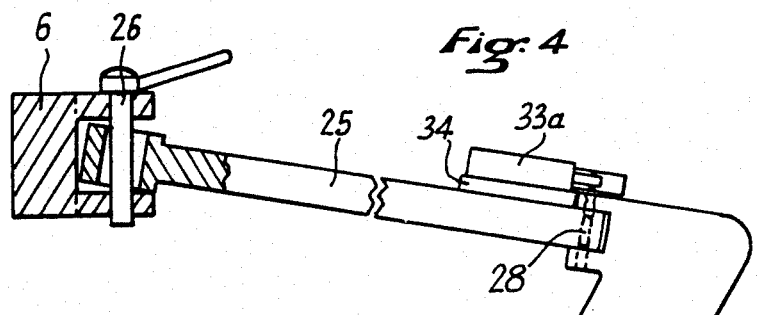
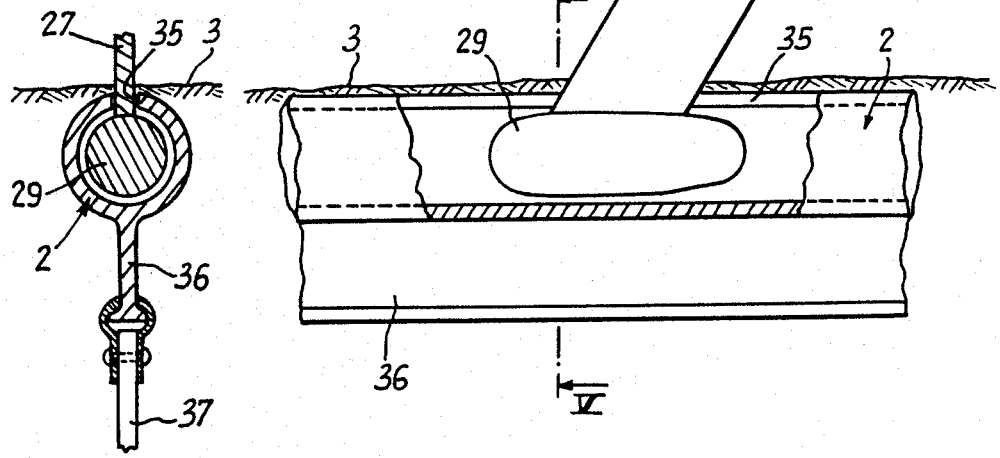

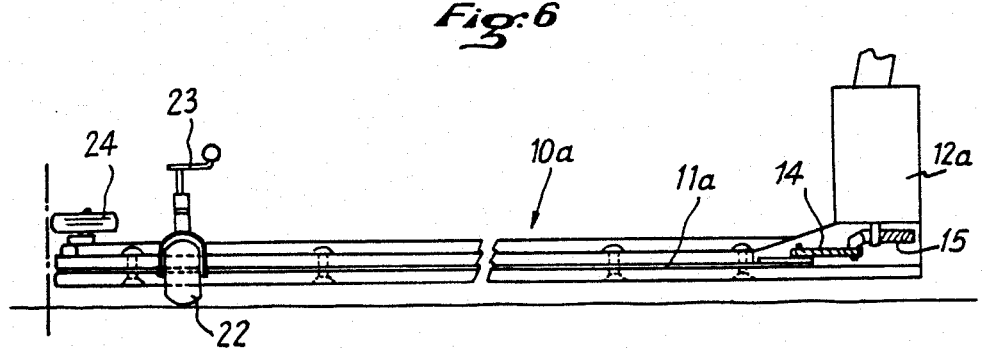
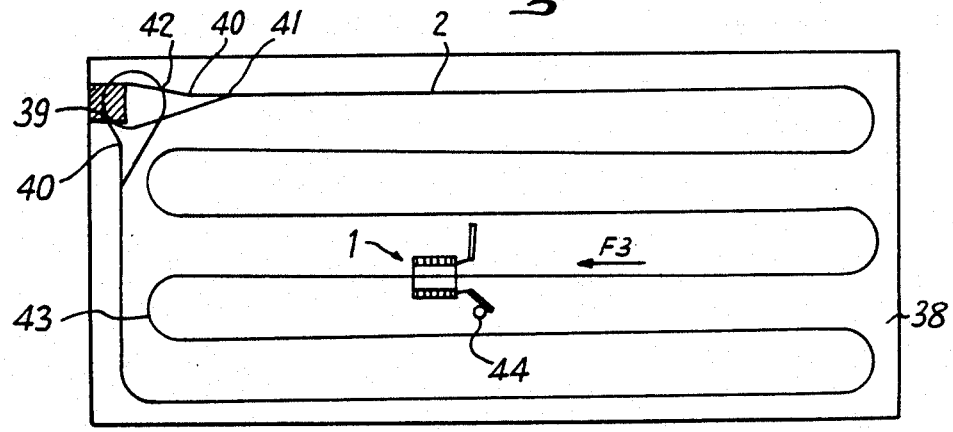
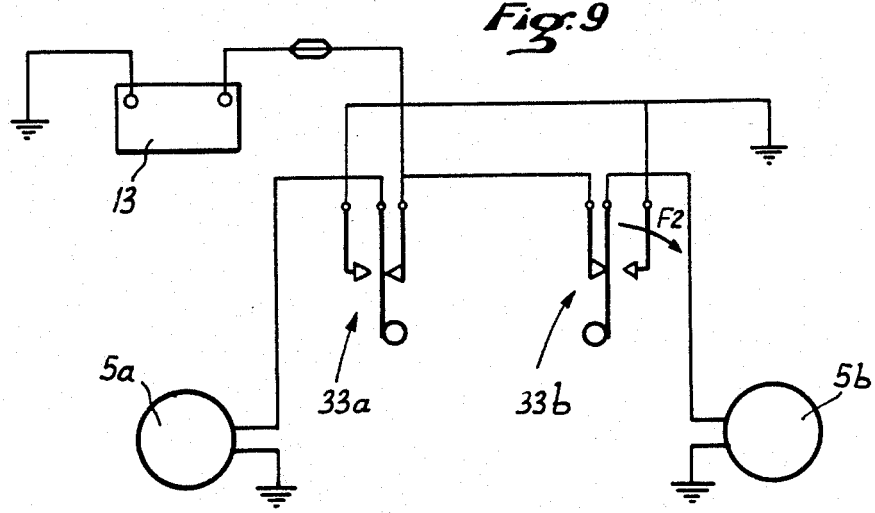

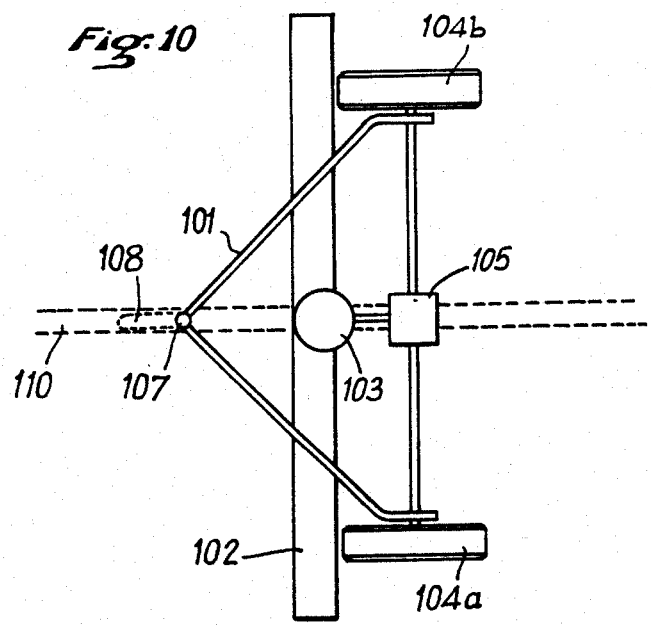
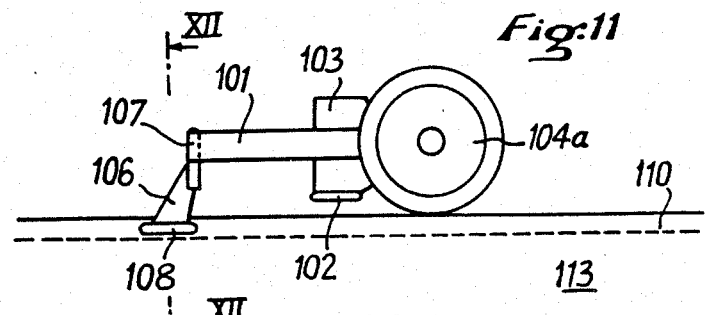
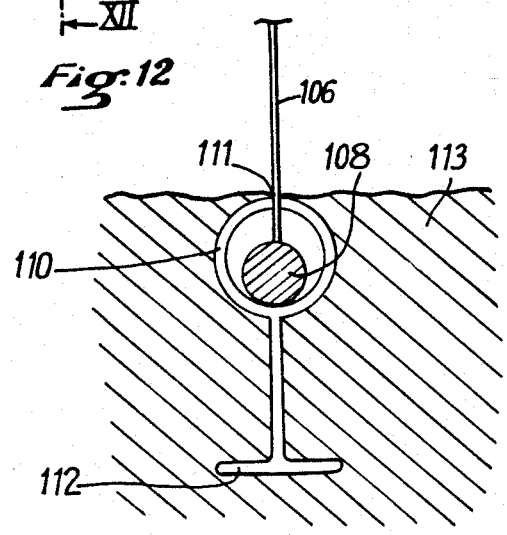

SYSTEM FOR AUTOMATIC PERFORMANCE OF AGRICULTURAL TASKS SUCH AS LAWN MOWING

This invention relates to a system for automatic performance of agricultural tasks such as lawn mowing.

Some agricultural tasks, and more particularly domestic tasks such as lawn mowing, are boring and tiring and further must be performed very regularly. Thus, for example, a lawn must be mowed at least once a week. If this regularity is missing, for example in case of absence of the person responsible for this operation, the lawn takes on an abandoned and unesthetic appearance. Further, the mowing operation which follows such an absence is always much longer and much more laborious than a normal mowing performed regularly.

Further, a good number of these agricultural tasks are not without danger, especially when they are performed by individuals without much experience. Thus, lawn mowing is responsible for a large number of cut fingers and hands.

Therefore there is an acute need for a system which would make it possible to perform automatically, without human intervention, a certain number of agricultural tasks such as in particular domestic agricultural tasks such as lawn mowing.

This invention aims at providing such a system which could be installed without difficulty in a certain area such as a lawn, and which is simple and cheap enough to be able to be bought by individuals.

For this purpose, the invention has as its object a system for automatic performance of agricultural tasks such as lawn mowing, characterized in that it comprises in combination a guide rail more or less buried in the ground, and an agricultural vehicle such as a lawn mower, provided with a support frame with at least one tool such as a cutting bar, drive means and guide means mounted movably on said support frame and designed to work with said guide rail to cause said vehicle approximately to follow the guide rail.

According to a first embodiment, said drive means are drive and steering means and said vehicle is further provided with control means for controlling said drive and steering means as a function of the relative position of the guide means in relation to the support frame.

The guide rail can advantageously be made in the shape of a tube of relatively elastic material, for example, a plastic pipe, split along its upper generatrix, said guide means comprising a guide element designed to move inside said tube by being driven by said vehicle by means of a suppot element going through the slot of this tube.

It is understood that under these conditions the guide element driven longitudinally along the tube by its support element laterally follows the curves of the tube, which causes it to tilt in relation to the support frame of the vehicle and thus to activate the control means making it possible to bring the vehicle back into the axis of the tube.

The support element, for example, can comprise a shaped blade at one end of which is mounted said guide element, said blade being mounted at its other end in an articulated manner in relation to frame of the vehicle.

In a particular embodiment, said drive and steering means comprise two caterpillar tracks and the control means comprise means for selective stopping of the drive of one of the caterpillar tracks when the guide means deviate from a designated neutral position in relation to the frame.

The use of caterpillar tracks makes possible the use of a very simple all-or-nothing servocontrol. Still it is possible to envisage a vehicle with guiding wheels controlled by a proportional servocontrol.

In the case of a tracked vehicle, the drive and steering means can comprise two electric motors arranged to drive each of the caterpillar tracks, said means for selective stopping the drive of one of the caterpillar tracks then comprising two switches each placed in the power supply circuit of one of the motors and whose drive element is designed to work with a cam mounted on said guide means.

Of course, various positions can be adopted for the switches and the cam and in particular these positions can be reversed.

According to a second embodiment, said support frame rests on the ground by means of a front stand carrying at its lower end a guide element designed to work with the guide rail, and said vehicle is equipped with a drive motor mounted on the support frame and with two rear lateral traveling elements, said traveling elements being designed to be driven by said drive motor by means of a differential.

Such an arrangement enables the vehicle to follow the buried guide rail. Actually, when the it starts a curve, the guide element causes a pivoting of the vehicle on its two back traveling elements. Such a pivoting is possible despite the advance of the vehicle because the traveling elements are driven by means of a differential.

It will be noted that by differential is understood not only the mechanical device generally known by this name but also other devices making it possible to drive two traveling elements simultaneously at optionally different speeds. Thus, for driving the traveling elements it is possible to provide two dc motors whose windings are mounted in series, each of the motors driving one of the traveling elements.

In a particular embodiment of the invention, said guide rail also comprises a tube of relatively elastic material split along its upper generatrix and said guide element is designed to move inside said tube by being shoved by said vehicle by means of said stand going through the slot of this tube.

This stand, for example, can consist of a shaped blade mounted at its upper end, pivoting in relation to the frame of the vehicle around an approximately vertical axis.

It will be noted that the use of electric power to drive the vehicle makes it possible easily to automate not only the advance of the vehicle but also its entire operating cycle. Actually, it suffices to provide a programmer providing the starting of the vehicle along its guide rail at designated hours and days from a departure and arrival station. The vehicle can then be provided with a battery making supplying of its electric motors possible, and at the departure and arrival station a battery charger is provided to which the vehicle is automatically connected at the end of its work cycle.

As a variant, photovoltaic cell panels can be mounted directly on the vehicle itself.

In case of an automatic lawn mowing system, the vehicle can advantageously comprise a front cutting bar placed along its front edge. However, if it is desired that the vehicle have good maneuverability, for example, be able to go between trees, clumps of flowers, fences...it is preferable for this front blade to occupy only a limited width.

To avoid the drawback of too small a cutting width which would result from this, it is possible to provide at least one cutting bar mounted laterally on the support frame of the vehicle, means being provided to retract said lateral cutting bar in case of striking an obstacle.

Such an arrangement can function with complete safety. Thus, it is possible to provide on the front cutting bar a switch causing complete stopping of the vehicle in case of impact. On the other hand, the lateral cutting bar is retracted and consequently is not dangerous.

This lateral cutting bar can be mounted, for example, to rotate around an approximately vertical pin, solid with the frame, to be able to pivot backward in case of impact against the action of recall means designed to bring the cutting bar back to its normal lateral position after passing the obstacle.

In a particular embodiment, two lateral cutting bars are provided, each placed on one of the sides of the vehicle and designed optionally to be able to be retracted simultaneously.

By way of nonlimiting example two particular embodiments of the invention will now be described with reference to the accompanying diagrammatic drawings in which:

FIG. 1 is a side view of a system according to a first embodiment of the invention, and more particularly of a lawn mower adapted to this system, FIG. 2 is a section along line II—II of FIG. 1, FIG. 3 is a top view on a larger scale of the guide device of the lawn mower according to FIGS. 1 and 2, FIG. 4 is a side view partially in section of the device of FIG. 3 and of the guide rail according to the invention, FIG. 5 is a view in section along line V—V of FIG. 4, FIG. 6 is a rear view of a lateral cutting bar of the lawn mower of FIGS. 1 and 2, FIG. 7 is a partial top view of this cutting bar, FIG. 8 is a plan view of ground equipped with a system according to the invention, FIG. 9 is an electrical diagram of the supply circuit of the drive motors of the lawn mower of FIGS. 1 and 2, FIG. 10 is a top view of lawn mower according to a second embodiment of the invention, FIG. 11 is a side view, and FIG. 12 is a view in section on an enlarged scale according to line XII—XII of FIG. 11.

As shown in FIGS. 1 and 2, the system according to a first embodiment of the invention comprises in a general way a vehicle 1 forming a lawn mower, and pipe 2 constituting a rail buried in ground 3 of a lawn.

Vehicle 1 is equipped with two caterpillar tracks 4a and 4b driven respectively by electric motors 5a and 5b.

Frame 6 of vehicle 1 supports a front cutting bar 7 whose blade 8 is driven by an electric motor 9, and two lateral cutting bars 10a and 10b whose blades 11a and 11b are respectively driven by electric motors 12a and 12b.

A battery 13 makes possible the power supply of electric motors 5a, 5b, 9, 12a and 12b.

Motors 12a and 12b drive blades 11a and 11b with the aid of a connecting rod 14 and crank 15 device (FIGS. 6 and 7).

Each lateral cutting bar 10a and 10b is mounted at its end closest to the axis of vehicle 1 on arms 16a and 16b respectively, pivoting around a pin 17 solid with frame 6. The cutting bars can thus pivot backward around pin 17, as shown by arrows F of FIG. 2.

Return springs 18 mounted on pin 17 make it possible to bring the cutting bars back toward the front in their lateral positon where they strike against locking pins 19 solid with frame 6.

Vehicle 1 further comprises at its front part a bumper 20 provided with a master switch (not shown) making it possible, in case of front impact, to cut off the power supply of all the electric motors.

Each cutting bar also comprises a front bumper 21 which, when the cutting bar encounters an obstacle, causes, by reaction, a pivoting of the corresponding bar backward in the direction of arrow F.

The cutting bars are further provided at their end farthest from the axis of vehicle 1 with a small wheel 22 making possible the adjustment of the cutting height by means of a crank 23, and a roller 24 with a vertical axis making possible a regular advance of the cutting bar when vehicle 1 moves along a wall or a fence, for example.

It be noted that pin 17 is off-center in relation to the center plane of vehicle 1 and that arms 16a and 16b consequently have a different length. As a result the two cutting bars 10a and 10b can be pivoted simultaneously backward in case vehicle 1 goes along two obstacles, one located on the right, the other on the left.

The guide device of vehicle 1 will now be described with reference more particularly to FIGS. 3, 4, 5 and 8.

A hitch 25 is mounted freely at one of its ends on a fork head of frame 6 by a pin 26. At the other end of hitch 25 a support blade 27 is mounted to rotate around a pin 28 and receives at its end opposite pin 28 a shaped guide element 29 able to slide in tube 2.

Close to pin 28, blade 27 carries a cam 30 carrying two cam surfaces 31a and 31b. Each cam surface 31a and 31b is designed to work respectively with a cam follower consisting of the end of actuating element 32a and 32b of switches 33a and 33b. Switches 33a and 33b are mounted on a plate 34 solid with the end of the arm of hitch 25 opposite pin 26.

Switches 33a and 33b make it possible, when they are in their normal position represented in FIG. 8, to supply motors 5a and 5b respectively from battery 13. If the blade of support 27 is moved, for example in the direction of arrow F1 of figure 3, which corresponds to a turning of tube 2 in the direction opposite arrow F1, switch 33b is actuated by cam 30, which has the effect of causing its swinging symbolized in FIG. 8 by arrow F2. Motor 5b is thus no longer supplied, causing stopping of caterpillar track 4b, which has the effect of making vehicle 1 start to make a turn causing it to follow tube 2.

Pipe 2, made for example of polyethylene, is split along its upper generatrix 35 to allow the passage of guide blade 27 which is shaped to open the edges of slot 35 effortlessly during its passage.

Tube 2 further comprises a rib 36 making it possible to assure that slot 35 is indeed in the upper part of tube 2 and further allowing the anchoring of the tube in the ground with stakes 37.

FIG. 8 represents a lawn 38 under whose surface is buried guide tube 2 as described above. This tube is bent zigzag so that when vehicle 1 travels through it, its cutting bars cover practically the entire surface of ground 38. A starting and stopping station 39 is provided in a corner of the ground 38 and is provided with a programmer and a battery charger (not shown). Two turn-around loops 40 are provided at stopping and starting station 39 at each end of tube 2. Thus, successive mowing operations are performed each time in the direction opposite to the last time. Junction piece 41 and crossing piece 42 are provided for this purpose.

Vehicle 1 moves along tube 2 in the direction of arrow F3, for example. As long as vehicle 1 is in the axis of tube 2, cam 30 is in its neutral position represented in FIG. 3, and the motors of the two caterpillar tracks are supplied. On the contrary, if the vehicle swerves, for example to the right, or guide tube 2 starts a left turn such as 43, support blade 27 is caused by guide element 29, which slides in tube 2, to pivot in relation to frame 6 of the vehicle. As was seen above, this has the effect of cutting off motor 5a of caterpillar track 4a and consequently of making the vehicle turn to the left. Consequently the vehicle comes back into the axis of tube 2.

If the lateral cutting bar encounters an obstacle such as tree 44, it is retracted backward, then is brought back forward under the action of its return spring without modifying the functioning of vehicle 1. Of course, the path of tube 2 is provided so that no stationary obstacle is in front of the front cutting bar, and more particularly in front of bumper 20 of the vehicle. If, on the contrary, such an obstacle should appear unexpectedly, the master switch causes stopping of the vehicle and consequently interruption of the working cycle in progress.

The lawn mower represented in FIG. 10 comprises a triangular frame 101 whose point is directed forward in the direction of advance of the lawn mower. This frame supports a cutting bar 102 driven by an electric motor 103 supplied by a battery (not shown).

At its back end, frame 101 supports two lateral wheels 104a and 104b also driven by motor 103 by means of differential 105.

At its front end, frame 101 supports a stand 106 consisting of a shaped blade mounted to pivot in its upper part on frame 101 around a pin 107. At its lower end, shaped stand 106 receives a shaped guide element 108.

As shown in FIG. 12, this guide element is designed to be shoved by stand 106 inside plastic tube 110 split along its upper generatrix 111. Stand 106 goes through the slot of tube 110.

Further, tube 110 is solid with an anchoring section 112 enabling it to be kept buried in ground 113.

When the lawn mower advances, shaped guide element 108 is shoved in tube 110 so that, when the latter starts a turn, the mower follows the tube. During turning the inside wheel turns more slowly than the outside wheel which is possible because of differential 105.

Different variants and modifications can, of course, be made in the above description without thereby going outside the framework and spirit of the invention.

Thus, the wheels can be replaced by rollers of the same width as the cutting bar to crush the freshly cut grass.

Also, the mower described above could comprise a back part articulated on the frame and forming a trailer.

It is also possible to provide a switch to cut off the motor if the guide element leaves the rail and the stand is out of line.

The mower could also be supplied with alternating current from a power line, by a supply cable mounted on a winder.

We claim:

1. A system for the automatic performance of agricultural tasks such as lawn mowing, comprising in combination a guide rail at least partially buried in the ground, and an agricultural vehicle comprising
   a support frame,
   at least one tool mounted on the frame,
   drive means mounted on the frame, said drive means comprising a motor mounted on the frame, two rear lateral independent traveling elements, and a differential drive connecting said motor to each of said traveling elements, and
   guide means mounted movably on said support frame and adapted to cooperate with said guide rail so as to cause said vehicle to follow said guide rail, said guide means comprising a front stand having at its lower end a guide element for cooperating with said guide rail.

2. The invention of claim 1, wherein the guide rail comprises a tube of relatively elastic material having a slot extending along its upper generatrix, said guide means comprising a guide element adapted to move inside said tube upon being driven by said vehicle by means of a support element extending through said slot.

3. The invention of claim 2, wherein the support element comprises a shaped blade at one end of which is mounted said guide element, said blade being pivotally mounted at its other end to said frame.

4. The invention of claim 3, wherein said shaped blade is pivotally mounted in relation to the frame of the vehicle around an approximately vertical axis.

5. The invention of claim 1, further comprising at least one cutting bar mounted laterally on the support frame of the vehicle, and means for retracting said lateral cutting bar upon striking an obstacle.

6. The invention of claim 5, wherein said lateral cutting bar is mounted to rotate around an approximately vertical pin, affixed to the frame, so as to be able to pivot backward in case of impact, and further comprising recoil means adapted to bring the cutting bar back to its normal lateral position after passing the obstacle.

7. The invention of claim 5, comprising two of said lateral cutting bars, placed on opposite sides of the vehicle and further comprising means for retracting said bars simultaneously.

* * * * *